(12) United States Patent
Lamb et al.

(10) Patent No.: US 11,901,855 B2
(45) Date of Patent: Feb. 13, 2024

(54) POLYHARMONIC FLUX MOTOR LOSS INCREASE

(71) Applicant: Rockwell Automation Technologies, Inc., Mayfield Heights, OH (US)

(72) Inventors: Jacob Lamb, Mequon, WI (US); Zhendong Zhang, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 295 days.

(21) Appl. No.: 17/350,090

(22) Filed: Jun. 17, 2021

(65) Prior Publication Data
US 2022/0407439 A1 Dec. 22, 2022

(51) Int. Cl.
*H02P 6/28* (2016.01)
*H02P 27/08* (2006.01)

(52) U.S. Cl.
CPC ...................... *H02P 6/28* (2016.02)

(58) Field of Classification Search
CPC ............ H02P 27/08; H02P 6/28; H02P 6/183
See application file for complete search history.

(56) References Cited

U.S. PATENT DOCUMENTS

| 5,450,306 | A | * | 9/1995 | Garces | H02M 5/458 |
| | | | | | 363/58 |
| 5,532,568 | A | | 7/1996 | Huttunen | |
| 6,417,644 | B2 | | 7/2002 | Hammond et al. | |
| 6,819,077 | B1 | * | 11/2004 | Seibel | H02P 27/08 |
| | | | | | 318/811 |
| 7,294,989 | B2 | | 11/2007 | Saren | |
| 8,786,239 | B2 | * | 7/2014 | Iwashita | H02M 7/5395 |
| | | | | | 318/590 |
| 9,774,284 | B2 | | 9/2017 | Liu et al. | |
| 10,389,292 | B1 | | 8/2019 | Lamb et al. | |
| 11,456,680 | B2 | * | 9/2022 | Chai | H02M 1/0025 |
| 2021/0351689 | A1 | * | 11/2021 | Chai | H02M 7/537 |

OTHER PUBLICATIONS

D.G. Holmes, "Opportunities for Harmonic Cancellation with Carrier-Based PWM for Two-Level and Multilevel Cascaded Inverters", IEEE Transactions on Industry Applications, vol. 37, No. 2, Mar./apr. 2001, pp. 574-582.

* cited by examiner

*Primary Examiner* — Thai T Dinh
(74) *Attorney, Agent, or Firm* — Foley & Lardner LLP (57) ABSTRACT

For polyharmonic flux motor loss increase, a method offsets pulse width modulation (PWM) carriers to a motor to increase motor harmonics. The offset PWM carriers increase energy losses for the motor.

17 Claims, 11 Drawing Sheets

POLYHARMONIC FLUX MOTOR LOSS INCREASE

BACKGROUND INFORMATION

The subject matter disclosed herein relates to increasing motor losses.

BRIEF DESCRIPTION

A method for polyharmonic flux motor loss increase is disclosed. The method offsets pulse width modulation (PWM) carriers to a motor to increase motor harmonics. The offset PWM carriers increase energy losses for the motor.

An apparatus for polyharmonic flux motor loss increase is also disclosed. The apparatus includes a processor that executes code. The processor offsets PWM carriers to a motor to increase motor harmonics. The offset PWM carriers increase energy losses for the motor.

A computer readable program product for polyharmonic flux motor loss increase is also disclosed. The computer readable program includes a non-transitory computer readable storage medium having program code embodied therein. The program is code readable/executable by a processor to offset PWM carriers to a motor to increase motor harmonics. The offset PWM carriers increase energy losses for the motor.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1A:
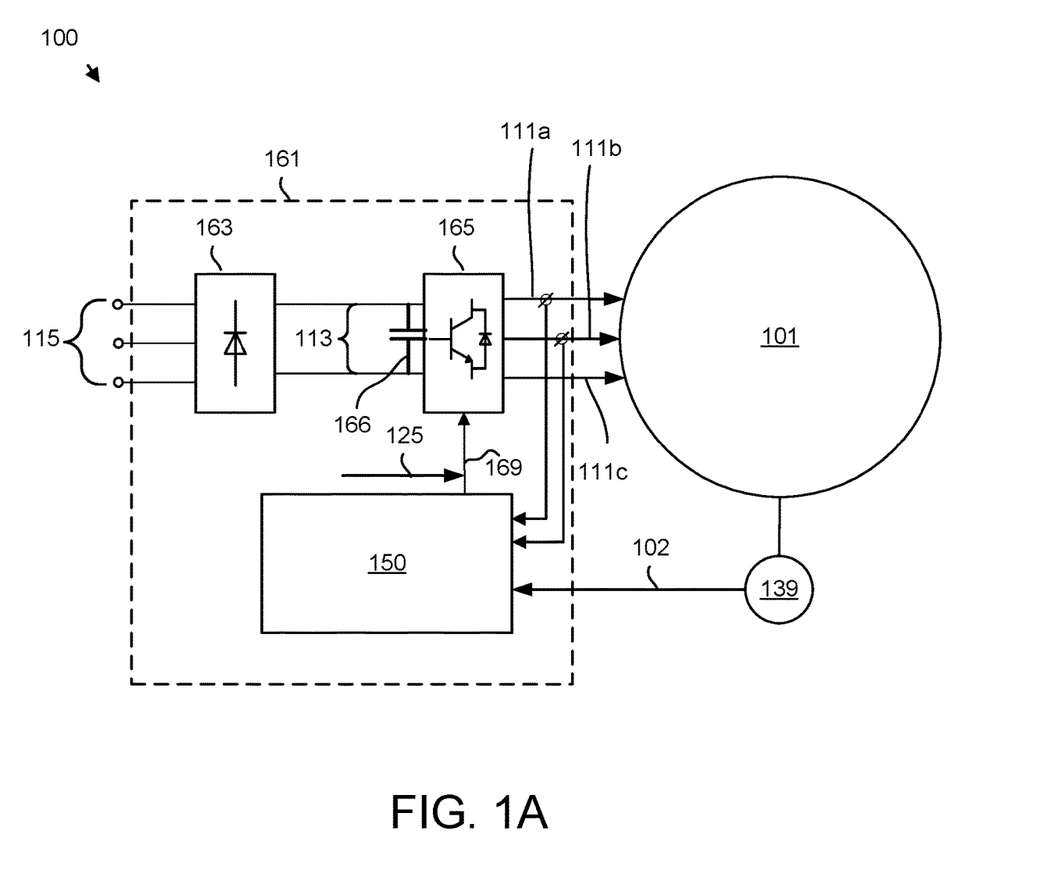
FIG. 1A is a schematic block diagram of motor system according to an embodiment.

FIG. 1 is a schematic diagram of motor system 100. The system 100 includes a motor 101 and a motor drive 161. The motor 101 may be selected from the group consisting of an induction motor, a synchronous reluctance motor, and a permanent magnet motor.

The motor 101 may be controlled by the motor drive 161. In the depicted embodiment, the motor drive 161 includes a rectifier and/or converter 163, referred to hereafter as a rectifier 163, an inverter 165, a bus capacitor 166, and a controller 150. The rectifier 163 receives a line voltage 115 The line voltage 115 is depicted as a three-phase line voltage 115, but other phase configurations may be employed. The rectifier 163 further provides a bus voltage 113 to the inverter 165. The bus capacitor 166 may filter the bus voltage 113.

Figure 4:
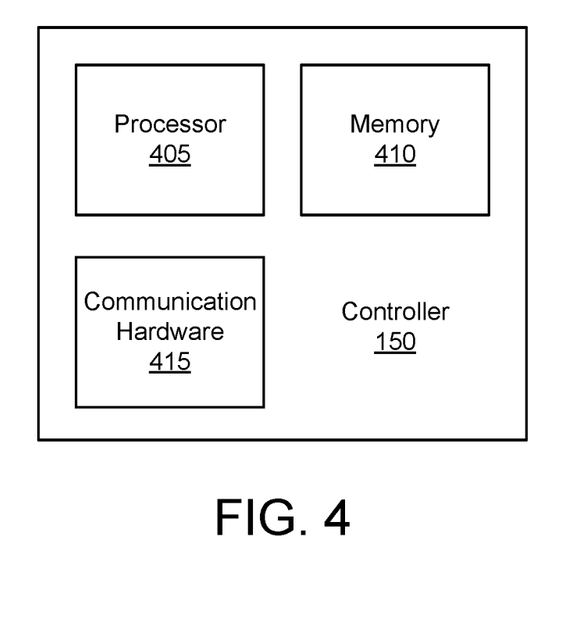
FIG. 4 is a schematic block diagram of a controller according to an embodiment.

The controller 150 may include a processor as shown in FIG. 4. The controller 150 may produce the motor control signals 169 to control the inverter 165 to generate PWM signals 111a-c that drive and control the motor 101. The motor control signals 169 may include a direct current $i_d$ and a quadrature current $i_q$. In the depicted embodiment, the system 100 includes an encoder 139 that generates a position signal 102. The position signal 102 is used accurately control the motor 101.

The motor drive 161 may control the motor 101 to generate torque at a specified angular velocity. The motor drive 161 may be required to control the motor 101 within a narrow range of angular velocities for a variety of loads. In a certain embodiment, at least a portion of the motor drive 161 comprises one or more of hardware and executable code, the executable code stored on one or more computer readable storage media.

The motor driver 161 may also decelerate and/or brake the motor 101. During deceleration, the kinetic energy of the motor 101 is converted to electrical energy that is transferred via the inverter 165 to the capacitor 166, as well as converted to heat via resistive loses throughout the motor system 100. Unfortunately, deceleration rates are limited by the rating of the capacitor 166. If the bus voltage 133 exceeds the rating of the capacitor 166, the capacitor 166 and/or motor system 100 may fail. As a result, controlled deceleration rates are limited by the controller 150.

The deceleration rate may be increased without exceeding the capacity of the bus voltage 113 by increasing losses of the motor 101. The embodiments may offset the PWM carriers 121 to increase energy loses for the motor 101. In addition, the embodiments may concurrently inject a high-frequency signal 125 to the motor control signal 169 to further increase energy loses. Embodiments may also modify the fundamental command of the motor control signal 169 to increase output current while producing a desired torque as will be described hereafter.

Figure 1B:
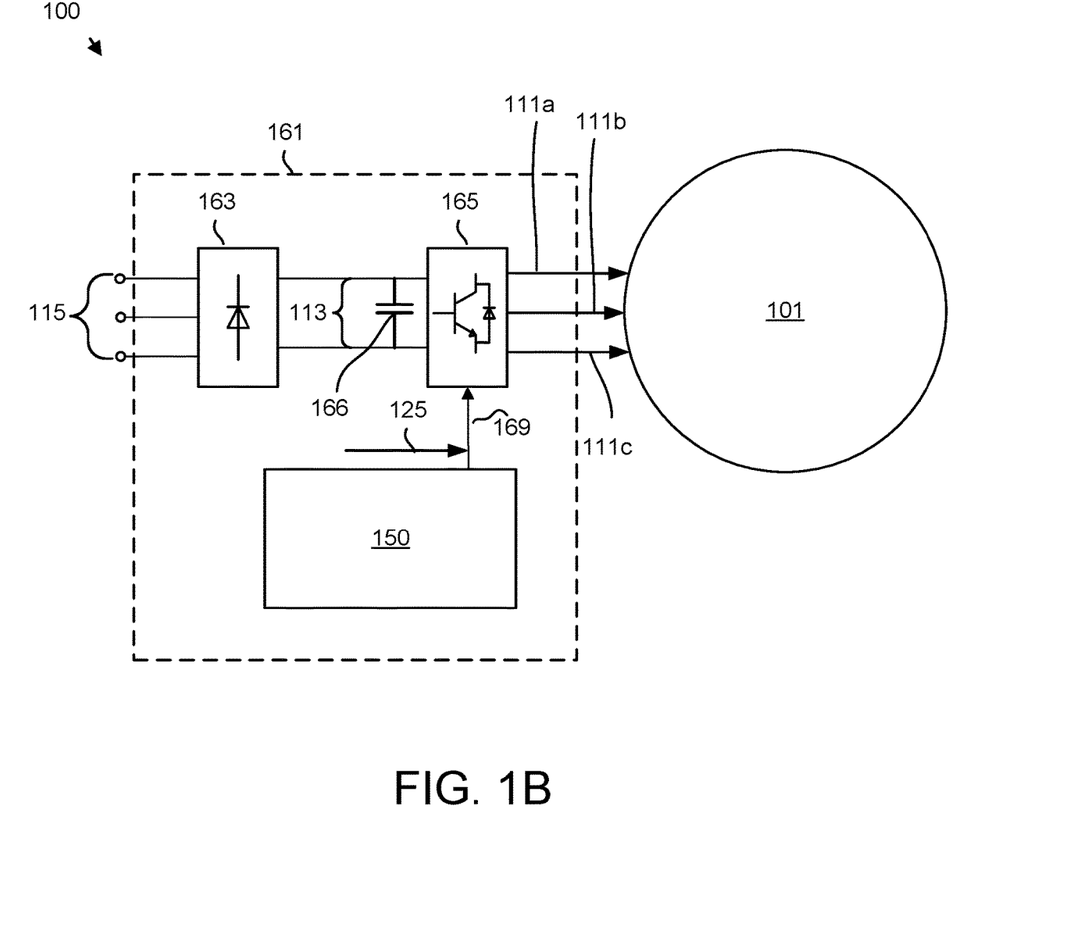
FIG. 1B is a schematic block diagram of motor system according to an alternate embodiment.

FIG. 1B is a schematic block diagram of an alternate motor system 100. The motor system 100 of FIG. 1A is shown without an encoder 139. In the depicted embodiment, the controller 150 controls the motor 101 open loop, without the position signal 102.

Figure 2A:
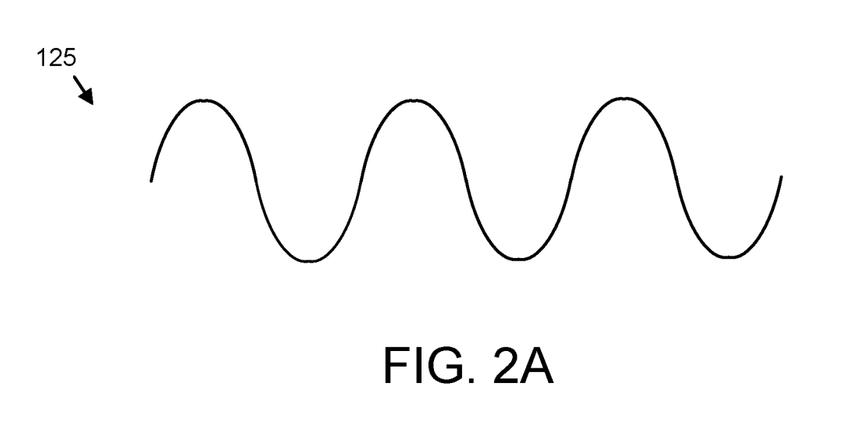
FIG. 2A is a diagram of a high-frequency signal according to an embodiment.

FIG. 2A is a diagram of the high-frequency signal 125. In the depicted embodiment, the high-frequency signal 125 is a sine wave. In one embodiment, the high-frequency signal 125 has a non-fundamental motor frequency. For example, the high-frequency signal 125 may be 400 Hertz (Hz).

The high-frequency signal 125 may be a function of a motor frequency of the motor 101. The motor frequency may be an output frequency of the motor 101. The non-fundamental motor frequency $f_{nf}$ may be calculated using Equation 1, wherein $f_m$ is the motor frequency, b is a fixed frequency and m and n are integer nonzero constants.

$$f_{nf} = \frac{m f_m}{n} + b \qquad \text{Equation 1}$$

Figure 2B:
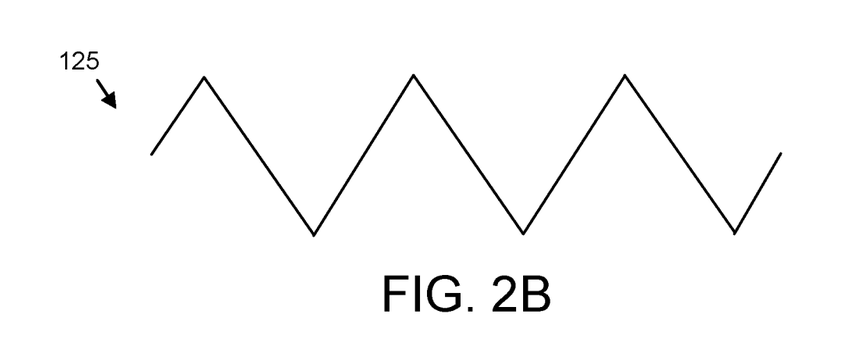
FIG. 2B is a diagram of a high-frequency signal according to an alternate embodiment.

FIG. 2B is a diagram of a high-frequency signal 125. In the high-frequency signal 125 is a triangle wave. The high-frequency signal 125 may have a non-fundamental motor frequency.

Figure 2C:
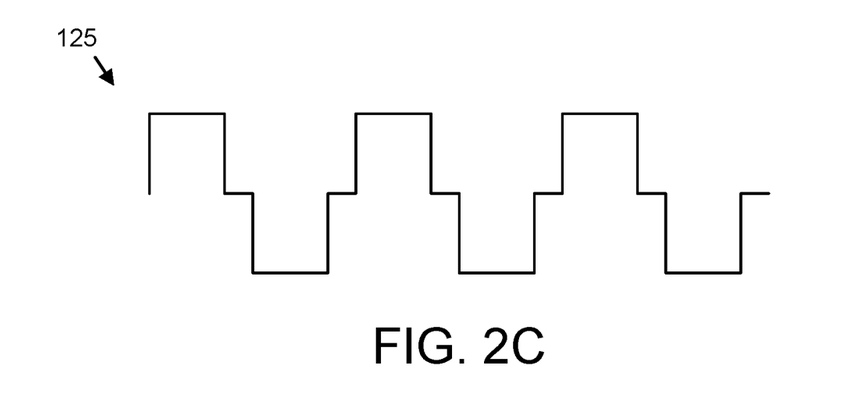
FIG. 2C is a diagram of a high-frequency signal according to an alternate embodiment.

FIG. 2C is a diagram of a high-frequency signal 125. In the high-frequency signal 125 is a square wave. The high-frequency signal may include a non-fundamental motor frequency harmonic.

Figure 3A:
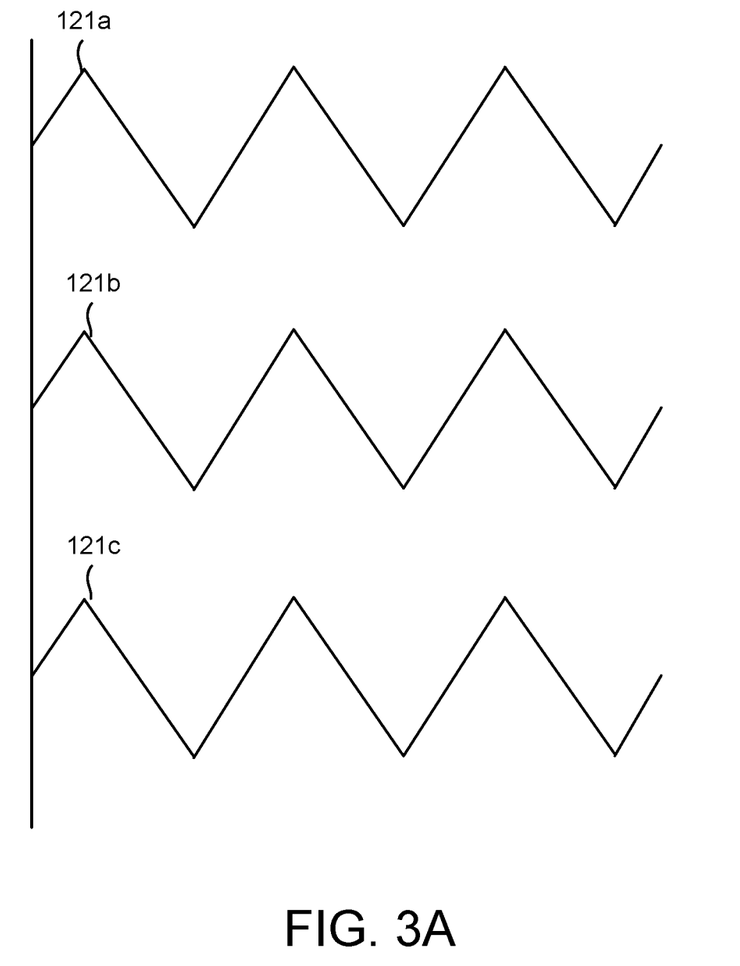
FIG. 3A is a diagram of PWM carriers according to an embodiment.

FIG. 3A is a diagram of PWM carriers 121. The inverter 165 may employ the PWM carriers 121 to generate the PWM signals 111a-c. In the depicted embodiment, the PWM carriers are in sync, with aligned carrier peaks.

Figure 3B:
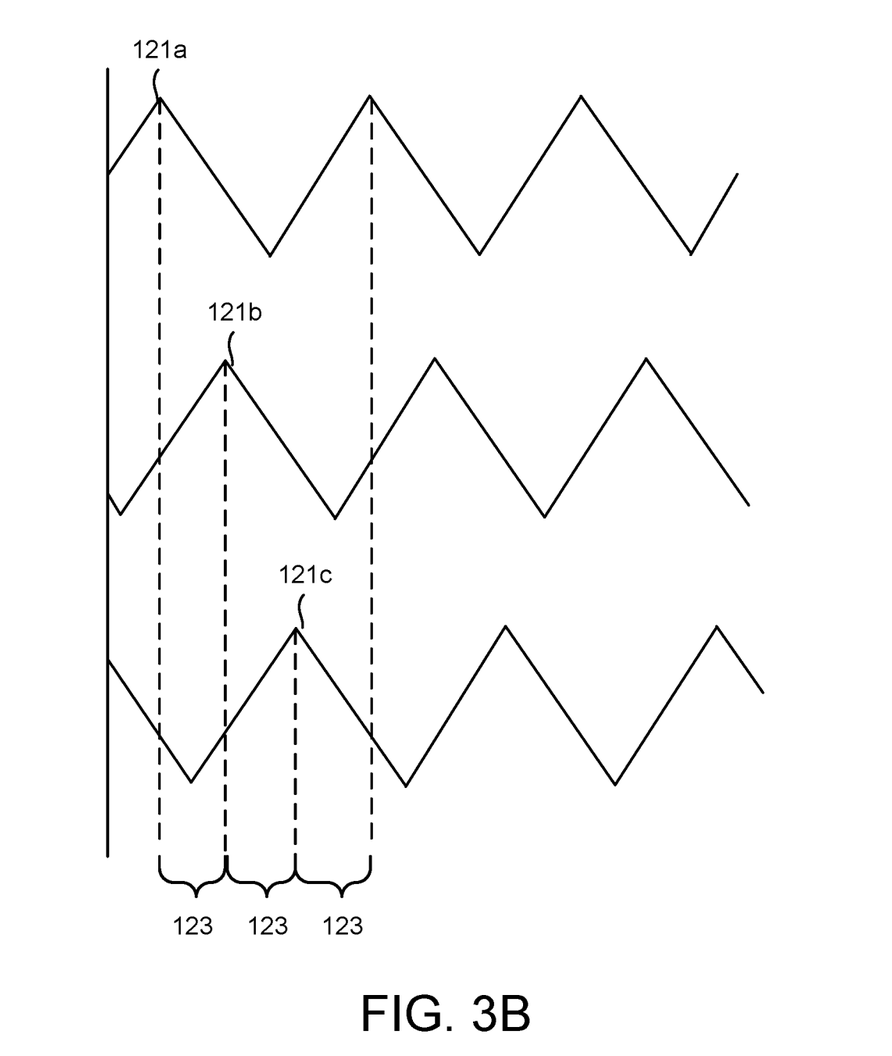
FIG. 3B is a diagram of offset pulse width PWM carriers according to an embodiment.

FIG. 3B is a diagram of offset pulse width PWM carriers 121. In the depicted embodiment each PWM carrier 121 is offset from each other PWM carrier 121 by an offset 123. In one embodiment, carrier peaks are offset by the offset 123.

The PWM carriers 121 may be offset to maximize line-line harmonics in the motor 101. In a certain embodiment, three PWM carriers 121 are each offset by 120-degree offsets 123 as shown.

In one embodiment, the three PWM carriers 121 are offset to maximize harmonics for each PWM carrier F(t) 121 as shown in Equation 2, wherein ω, is an angular velocity of the motor 101, t is time, $\theta_o$ is a fundamental waveform offset of the motor 101, $\omega_c$ is a carrier frequency, $\theta_c$ is a carrier offset, and C is a carrier amplitude.

$$F(t)=\Sigma_{n=1}^{\infty}\{C_{0n}\cos(n[\omega_o t+\theta_o])\}+\Sigma_{m=1}^{\infty}\Sigma_{n=-\infty}^{\infty}\{C_{mn}\cos(m[\omega_c t+\theta_c]+n[\omega_o t+\theta_o])\} \quad \text{Equation 2}$$

In one embodiment, the combination of increased motor harmonics from the offset PWM carriers 121 and the high-frequency signal 125 increases the energy losses for the motor 101.

FIG. 4 is a schematic block diagram of a controller 150. In the depicted embodiment, the controller 150 includes a processor 405, a memory 410, and communication hardware 415. The memory 410 may store code and data. The processor 405 may execute the code and process the data. The communication hardware 415 may communicate with other devices such as the inverter 165 and the encoder 139.

Figure 5:
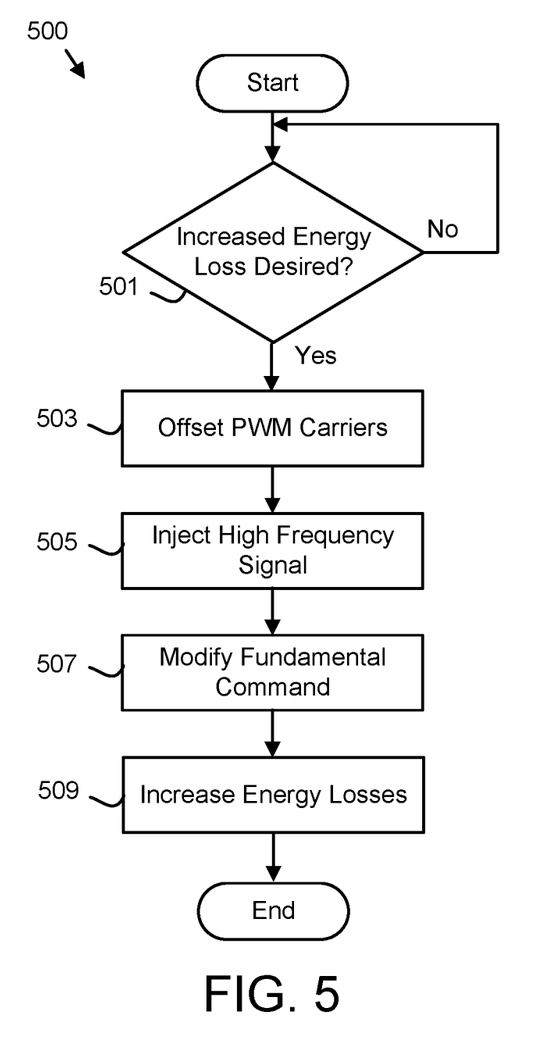
FIG. 5 is a schematic flow chart diagram of a flux motor loss increase method according to an embodiment.

FIG. 5 is a schematic flow chart diagram of a flux motor loss increase method 500. The method 500 may increase energy losses for the motor 101. The method 500 may be performed by the controller 150.

The method 500 starts, and in one embodiment, the controller 150 determines 501 if increased energy loss is desired. For example, increased energy loss may be desired when braking the motor 101. If increased energy loss is not desired, the controller 150 looks to continue determining 501 if increased energy loss is desired.

If increased energy loss is desired, the controller 150 may perform one or more of offsetting 503 the PWM carriers 121, injecting 505 the high-frequency signal 125, and/or modifying a fundamental command of the motor control signal 169. Offsetting 503 the PWM carriers 121, injecting 505 the high-frequency signal 125, and/or modifying 507 a fundamental command of the motor control signal 169 may be performed concurrently, serially, or combinations thereof.

The controller 150 may offset 503 PWM carriers 121 to the motor 101 to increase motor harmonics. In one embodiment, each PWM carrier 121 is offset from at least one other PWM carrier 121 by the offset 123. The offset PWM carriers 121 increase energy losses for the motor as will be illustrated hereafter.

The controller 150 may further inject 505 the high-frequency signal 125 into the motor control signal 169 for the motor 101. In one embodiment, the combination of increased motor harmonics and the high-frequency signal 125 increases the energy losses for the motor 101.

The controller 150 may modify 507 the fundamental command of the motor control signal 169 to increase constant current of the motor 101 while producing a desired torque. For example, the constant current may be increased to a predefined current value. The modified fundamental command may change an operating point of the motor 101 to increase the constant current. The direct current $i_d$ of the motor control signal 169 may be greater than zero as shown in FIG. 6C. In addition, the quadrature current $i_q$ of the motor control signal may be greater than zero as shown in FIG. 6D. The motor control signal 169 may specify that a motor velocity is negative. The modification 507 of the fundamental command is illustrated in FIGS. 6C-D.

Offsetting 503 the PWM carriers 121, injecting 505 the high-frequency signal 125, and/or modifying 507 the fundamental command of the motor control signal 169, in combination and/or singly, increases 509 the energy losses of the motor 101 and the method 500 ends. In one embodiment, the increased energy losses enable increased motor braking torque without exceeding a given bus voltage 113. The increased energy losses may increase motor braking torque at the given bus voltage 113.

Figure 6A:
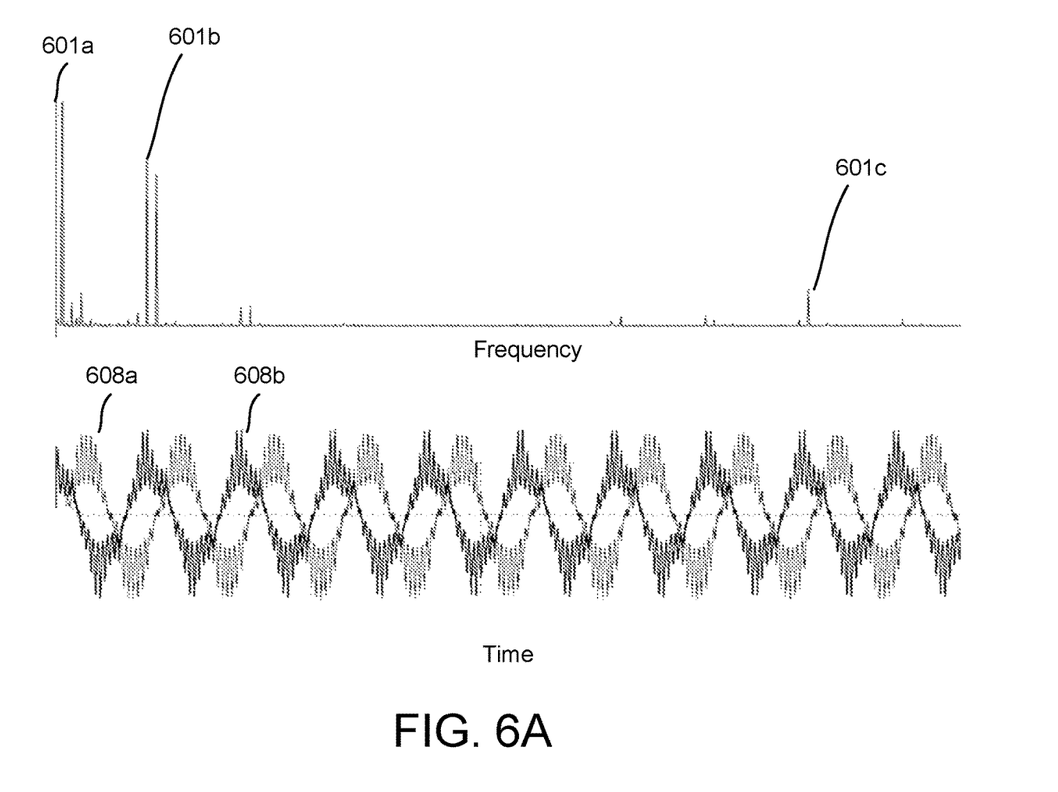
FIG. 6A is a graph of phase currents and corresponding harmonic frequencies according to an embodiment.

FIG. 6A is a graph of phase current $i_a$ 608a and phase current $i_b$ 608b of the motor control signal 169 as a result of offsetting the PWM carriers 121 and injecting the high-frequency signal 125. The resulting motor harmonics 601 for the motor 101 are shown, including a fundamental component harmonic frequency 601a, a 500 Hz component harmonic frequency 601b, and a three-carrier high-frequency signal harmonic frequency 601c. In the depicted embodiment, the combination of the motor harmonics 601 and the high-frequency signal 125 increases the energy loses for the motor 101.

Figure 6B:
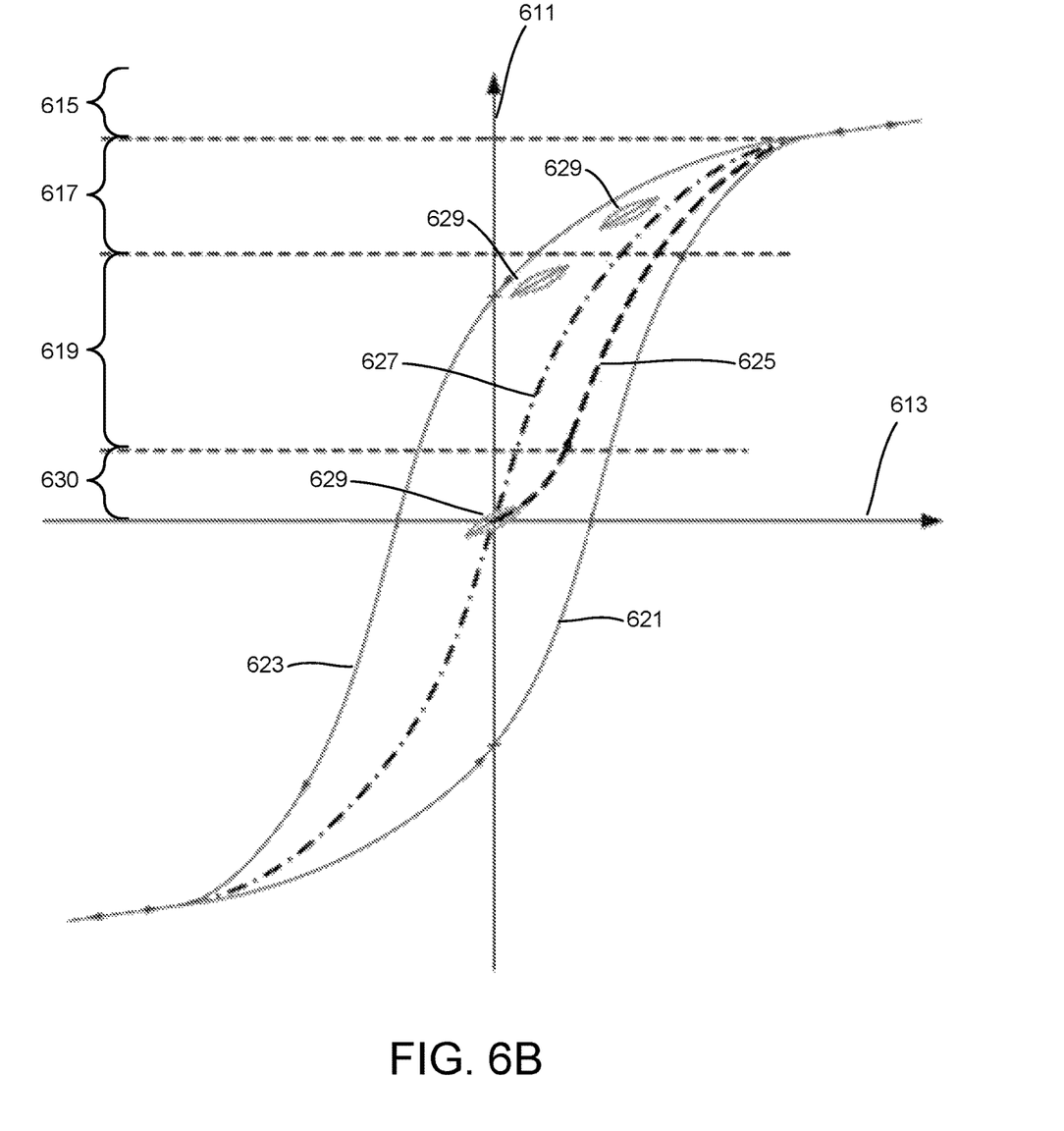
FIG. 6B is a graph of flux density as a function of an applied magnetic field according to an embodiment.
Figure 6C:
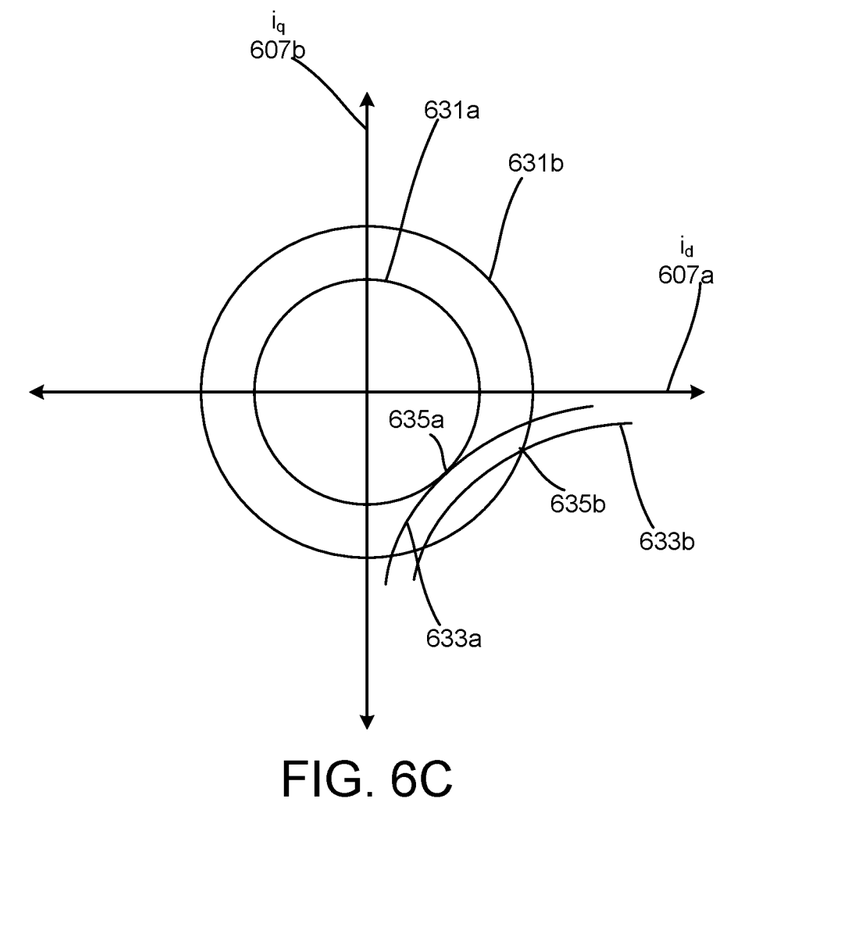
FIG. 6C is a graph of constant current curves according to an embodiment.
Figure 6D:
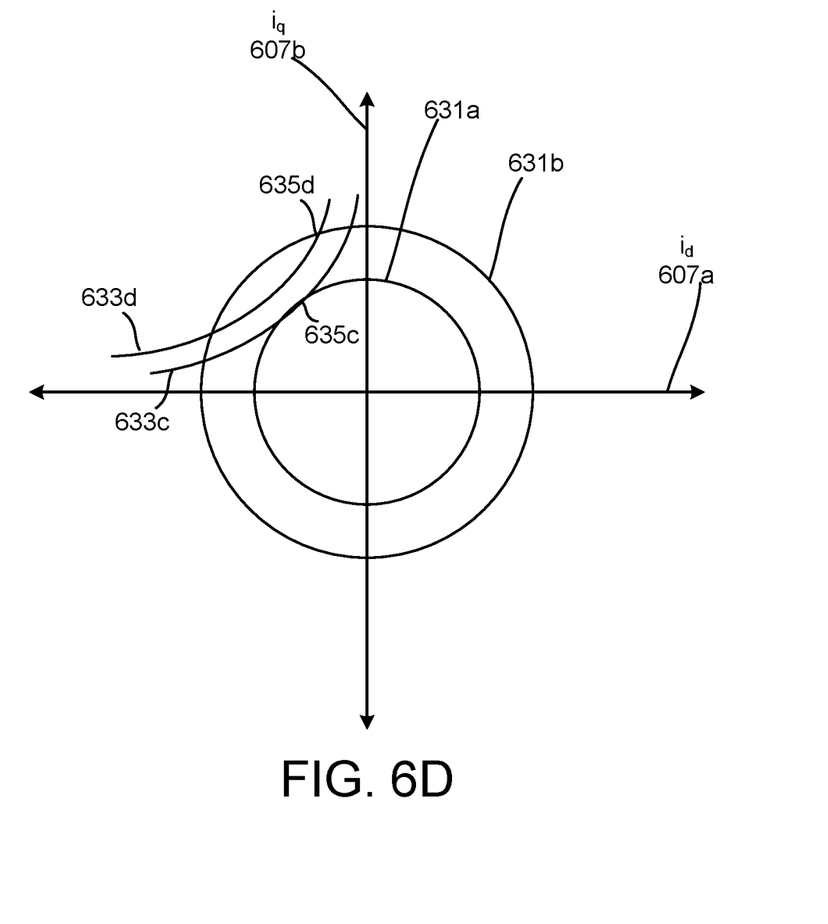
FIG. 6D is a graph of constant current curves according to an embodiment.

FIG. 6B is a graph of flux density as a function of an applied magnetic field. In the depicted embodiment, flux density B(H) 611 is graphed for an applied field H 613. The flux density 611 for a saturated state 615, a magnetic moment rotation 617, an irreversible domain wall motion 619, and a reversible domain wall motion 630 are shown. A major loop 623, initial magnetization curve 625, and ideal magnetization curve 627 for the motor 101 are also shown. Offsetting the PWM carriers 121 and/or injecting the high-frequency signal 125 of the motor control signal 169 generate Rayleigh loops 629 that increase energy losses in the motor 101.

FIG. 6C is a graph of constant current curves 631 for the direct current $i_d$ 607a and the quadrature current $i_q$ 607b for a motor 101 with positive angular velocity. Fixed output torque operating curves 633a-b are also shown, wherein each point of each fixed output torque operating curve 633 is a fixed output torque. The motor 101 operates at operating points 635a-b at intersections of a constant current curve 631 and a fixed output torque operating curve 633. Modifying a fundamental command of the motor control signal 169 moves the operating point 635 from a smaller constant current 631 to a larger constant current 631, increasing the braking torque of the motor 101 at a given bus voltage 113.

In the depicted example, modifying the fundamental command of the motor control signal 169 moves the operating point 635a from a smaller constant current 631a to a larger constant current 631b at operating point 635b.

FIG. 6D is a graph of constant current curves 631 for the direct current $i_d$ 607a and the quadrature current $i_q$ 607b for a motor 101 with positive angular velocity. The fixed output torque operating curves 633a-b of FIG. 6C are also shown. The motor 101 operates at operating points 635c-d at intersections of a constant current curve 631 and the fixed output torque operating curve 633. Modifying a fundamental command of the motor control signal 169 moves the operating point 635c from a smaller constant current 631a to a larger constant current 631b, increasing the braking torque of the motor 101 at a given bus voltage 113.

Problem/Solution

The motor driver 161 may control the motor 101 to decelerate and/or brake, causing the kinetic energy of the motor 101 to be converted to electrical energy that is transferred to the bus voltage 113. Because the bus voltage 113 cannot exceed the rating of the capacitor 166, controlled braking is limited.

The embodiments increase the deceleration rate and/or braking by increasing energy losses in the motor 101. The energy losses are increased by offsetting the PWM carriers 121, injecting the high-frequency signal 125, and/or modifying a fundamental command of the motor control signal 169 to generate Rayleigh loops 629 and/or increase constant current. As a result, more braking torque is generated for a limited bus voltage 113.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
offsetting pulse width modulation (PWM) carriers to a motor to increase motor harmonics, wherein the offset PWM carriers increase energy losses for the motor; and
concurrently injecting a high-frequency signal into a motor control signal for the motor, wherein the high-frequency signal is a sine wave with a non-fundamental motor frequency, and wherein the high-frequency signal is a function of a motor frequency and the combination of increased motor harmonics and the high-frequency signal increases the energy losses for the motor.

2. The method of claim 1, wherein the non-fundamental motor frequency $f_{nf}$ is calculated as $$f_{nf} = \frac{m f_m}{n} + b$$

wherein $f_m$ is the motor frequency, b is a fixed frequency, and m and n are integer nonzero constants.

3. The method of claim 1, wherein the PWM carriers are offset to maximize line-line harmonics in the motor.

4. The method of claim 1, wherein three PWM carriers are each offset by 120-degree offsets.

5. The method of claim 1, the method further comprising modifying a fundamental command of the motor control signal to increase output current while producing a desired torque.

6. The method of claim 1, wherein the increased energy losses enable increased motor braking torque at a given bus voltage.

7. The method of claim 1, wherein the offset PWM carriers generate Rayleigh loops.

8. The method of claim 1, wherein the motor is selected from the group consisting of an induction motor, a synchronous reluctance motor, and a permanent magnet motor.

9. An apparatus comprising:
a processor executing code to perform:
offsetting pulse width modulation (PWM) carriers to a motor to increase motor harmonics, wherein the offset PWM carriers increase energy losses for the motor, and wherein the increased energy losses enable increased motor braking torque at a given bus voltage.

10. The apparatus of claim 9, the processor further concurrently injecting a high-frequency signal into a motor control signal for the motor.

11. The apparatus of claim 10, wherein the high-frequency signal is a sine wave with a non-fundamental motor frequency.

12. The apparatus of claim 11, wherein the high-frequency signal is a function of a motor frequency and the combination of increased motor harmonics and the high-frequency signal increases the energy losses for the motor.

13. The apparatus of claim 12, wherein the non-fundamental motor frequency $f_{nf}$ is calculated as $$f_{nf} = \frac{m f_m}{n} + b$$

wherein $f_m$ is me motor frequency, b is a fixed frequency, and m and n are integer nonzero constants.

14. The apparatus of claim 9, wherein the PWM carriers are offset to maximize line-line harmonics in the motor.

15. The apparatus of claim 9, wherein three PWM carriers are each offset by 120-degree offsets.

16. The apparatus of claim 9, the processor further modifying a fundamental command of the motor control signal to increase output current while producing a desired torque.

17. A computer program product comprising a non-transitory computer readable storage medium having code embodied therein, the code readable/executable by a processor to perform:
offsetting pulse width modulation (PWM) carriers to a motor to increase motor harmonics, wherein the offset PWM carriers increase energy losses for the motor, and wherein the offset PWM carriers generate Rayleigh loops.

* * * * *